US008897625B2

(12) United States Patent
Tabuchi et al.

(10) Patent No.: US 8,897,625 B2
(45) Date of Patent: Nov. 25, 2014

(54) SLIDESHOW DISPLAY CONTROL FOR A DISPLAY CONTROL APPARATUS

(75) Inventors: Tatsuhito Tabuchi, Chiba (JP); Takeshi Harada, Tokyo (JP); Yuji Saitou, Tokyo (JP); Masahiro Takahashi, Kanagawa (JP); Mitsuo Okumura, Tokyo (JP)

(73) Assignee: Sony Corporation, Tokyo (JP)

( * ) Notice: Subject to any disclaimer, the term of this patent is extended or adjusted under 35 U.S.C. 154(b) by 1566 days.

(21) Appl. No.: 11/566,874

(22) Filed: Dec. 5, 2006

(65) Prior Publication Data

US 2007/0147793 A1      Jun. 28, 2007

(30) Foreign Application Priority Data

Dec. 28, 2005   (JP) ................................. 2005-378839

(51) Int. Cl.
| H04N 5/783 | (2006.01) |
| H04N 5/225 | (2006.01) |
| H04N 1/21 | (2006.01) |
| H04N 5/445 | (2011.01) |
| H04N 5/232 | (2006.01) |
| H04N 1/00 | (2006.01) |
| H04N 101/00 | (2006.01) |

(52) U.S. Cl.
CPC ......... *H04N 1/2112* (2013.01); *H04N 5/44543* (2013.01); *H04N 5/783* (2013.01); *H04N 5/23245* (2013.01); *H04N 1/00453* (2013.01); *H04N 1/00458* (2013.01); *H04N 1/00461* (2013.01); *H04N 1/2129* (2013.01); *H04N 1/2133* (2013.01); *H04N 2101/00* (2013.01)
USPC ........................................ 386/343; 348/220.1

(58) Field of Classification Search
CPC ....................... H04N 5/23216; H04N 1/00453; H04N 1/00458; H04N 1/00461; H04N 1/2129; H04N 1/2133; H04N 1/2112; H04N 2101/00

USPC ............... 348/220.1, 333.01, 333.11, 333.12; 386/343–352
See application file for complete search history.

(56) References Cited

U.S. PATENT DOCUMENTS 6,154,210 A * 11/2000 Anderson .................... 715/840
6,919,927 B1 * 7/2005 Hyodo ..................... 348/333.02
(Continued)

FOREIGN PATENT DOCUMENTS

| JP | 5-324625 | 12/1993 |
| JP | 11-331739 | 11/1999 |

(Continued)

OTHER PUBLICATIONS

Office Action issued in Japanese Application No. 2005-378839.

(Continued)

*Primary Examiner* — Gelek W Topgyal
(74) *Attorney, Agent, or Firm* — Oblon, Spivak, McClelland, Maier & Neustadt, L.L.P.

(57) ABSTRACT

A display control apparatus includes: reading means for reading still image data from a recording medium on which the still image data are recorded in a predetermined order; display control means for displaying the still images read by the reading means; and still image accepting means for accepting commands regarding display of the still images, wherein when a command for a slideshow of the still images has been accepted by the still image accepting means with one of the still images under display, the reading means reads pieces of the still image data successively, starting with the still image data next to the still image data corresponding to the one under display, and the display control means displays still images corresponding to the still image data read by the reading means successively, following the one under display, whereby to make the slideshow display.

11 Claims, 11 Drawing Sheets

(56) References Cited

U.S. PATENT DOCUMENTS

| | | | |
|---|---|---|---|
| 7,239,348 B2* | 7/2007 | Miyazaki | 348/231.4 |
| 7,319,490 B2* | 1/2008 | Kanamori et al. | 348/375 |
| 7,669,131 B2* | 2/2010 | Matsuyama | 715/730 |
| 7,701,500 B2* | 4/2010 | Aizawa et al. | 348/333.01 |
| 2002/0033889 A1* | 3/2002 | Miyazaki | 348/232 |
| 2003/0071904 A1* | 4/2003 | Karasaki et al. | 348/231.3 |
| 2003/0090572 A1* | 5/2003 | Belz et al. | 348/207.1 |
| 2005/0102609 A1* | 5/2005 | Izume et al. | 715/512 |

FOREIGN PATENT DOCUMENTS

| | | |
|---|---|---|
| JP | 11-341421 | 12/1999 |
| JP | 2002-246927 | 8/2002 |
| JP | 2003-288068 | 10/2003 |
| JP | 2004-170368 | 6/2004 |
| JP | 2004-215123 A | 7/2004 |
| JP | 2004-219810 | 8/2004 |
| JP | 2004-289560 | 10/2004 |
| JP | 2005-64927 | 3/2005 |
| JP | 2005-196784 | 7/2005 |
| JP | 2005-341391 | 12/2005 |
| JP | 2005-354285 | 12/2005 |
| JP | 2007-36450 | 2/2007 |

OTHER PUBLICATIONS

Office Action issued Jun. 19, 2012, in Japanese Patent Application No. 2005-378839.

* cited by examiner

SLIDESHOW DISPLAY CONTROL FOR A DISPLAY CONTROL APPARATUS

BACKGROUND OF THE INVENTION

1. Field of the Invention

The present invention relates to a display control apparatus and a display control method, and a program thereof, and particularly to a display control apparatus and a display control method, and a program thereof, by which a user can display images as a slideshow, starting with a desired still image.

2. Description of Related Art

Cameras have become popular lately, such as video cameras capable of imaging both movie images and still images, i.e., video cameras having both functions of a conventional video camera and a conventional still camera.

Also, to display a plurality of still images produced by imaging, apparatus have been widespread, such as digital still cameras and personal computers, which can perform a so-called slideshow for displaying these still images successively in a predetermined order. In such apparatus, a user selects a slideshow display item from among menu items, or operates a special slideshow button, whereby to command a slideshow display. See, e.g., Japanese Patent Application Publication No. 2003-288068 (at FIG. 8)

Referring to FIG. 1, a case where the user commands a slideshow display by selecting the slideshow display item from among the menu items will be described.

In an example of FIG. 1, note that a screen 1 is displayed on a touch panel and that still images to be displayed on the screen 1 are recorded in the order they have been imaged.

On the screen 1 of FIG. 1, one of the still images recorded, which has been designated for display by the user, is displayed. Also, a stop button 11, a back button 12, and a forward button 13 are displayed at the lower part of the screen 1 of FIG. 1.

The stop button 11 is operated (pressed) to stop display of the screen 1. The back button 12 is operated to select for display a previous still image which has been imaged immediately before the still image under display on the screen 1. The forward button 13 is operated to select for display a next still image which has been imaged immediately after the still image under display on the screen 1.

Additionally, a Menu button 14 is displayed at the upper right of the screen 1 of FIG. 1. The Menu button 14 is operated to select any of various menu items including the slideshow display item.

To run a slideshow, the user operates the Menu button 14, whereby buttons through which to select any of the various menu items appear onscreen, and then operates a button for selecting the slideshow display item from among these buttons, to command a slideshow display.

Thus, to command a slideshow display requires the user to first operate the Menu button 14 and then select the slideshow display item, making the operation complicated. Therefore, the user is reluctant to use the slideshow function frequently.

Note that the buttons are displayed, i.e., provided on the touch panel in FIG. 1, but may be provided alternatively on the apparatus.

Referring next to FIG. 2, a case where the user commands a slideshow display by pressing a special slideshow button will be described.

In an example of FIG. 2, a slideshow button 31 is provided on a predetermined surface 30 of the housing of the apparatus. This slideshow button 31 is operated to command a slideshow display. The user operates the slideshow button 31 when commanding a slideshow display.

Note that the slideshow button 31 is provided on the apparatus in FIG. 2, but may be provided otherwise on the touch panel.

However, where the user has commanded a slideshow display, the above-mentioned apparatus that perform a slideshow, display a plurality of still images for the slideshow stored in a predetermined order, starting with the first one of the images.

Therefore, such apparatus have not been capable of satisfying the user needs for running a slideshow of the plurality of still images stored in the predetermined order, starting with a still image occurring at any point in the order, for sequential display of the subsequent images.

SUMMARY OF THE INVENTION

The present invention has been made in view of such circumstances, and is, therefore, to enable the user to start a slideshow display with any desired still image.

A display control apparatus according to one aspect of the present invention includes reading means for reading still image data from a recording medium on which the still image data being image data including a plurality of still images are recorded in a predetermined order, display control means for displaying the still images corresponding to the still image data read by the reading means, and still image accepting means for accepting commands regarding display of the still images. When a command for a slideshow display of the still images has been accepted by the still image accepting means with one of the still images under display, the reading means reads corresponding pieces of the still image data successively, starting with a piece of the still image data next to a piece of the still image data corresponding to the one of the still images under display. When a command for a slideshow display of the still images has been accepted by the still image accepting means with one of the still images under display, the display control means displays still images corresponding to the corresponding pieces of the still image data read by the reading means successively, following the one of the still images under display, whereby to make the slideshow display.

The display control means may display the still image accepting means together with the one of the still images.

There may further be provided movie image accepting means for accepting commands regarding display of movie images. The recording medium may have the still image data and movie image data being image data including the movie images, recorded thereon in a plurality of pieces in a predetermined order. When a command for a slideshow display of the still images has been accepted by the still image accepting means with one of the still images under display, the reading means may read corresponding pieces of the still image data or movie image data successively, starting with a piece of the still image data or movie image data next to a piece of the still image data corresponding to the one of the still images under display. When a command for a slideshow display of the still images has been accepted by the still image accepting means with one of the still images under display, the display control means may display still images or movie images corresponding to the corresponding pieces of the still image data or movie image data read by the reading means successively, following the one of the still images under display, whereby to make the slideshow display, and may display the still image accepting means together with the one of the still images, and may further display the movie image accepting means together with one of the movie images.

The recording medium may have the still image data and movie image data being image data including movie images, recorded thereon in a plurality of pieces in a predetermined order. When a command for a slideshow display of the still images has been accepted by the still image accepting means with one of the still images under display, the reading means may read corresponding pieces of the still image data or movie image data successively, starting with a piece of the still image data or movie image data next to a piece of the still image data corresponding to the one of the still images under display. When a command for a slideshow display of the still images has been accepted by the still image accepting means with one of the still images under display, the display control means may display still images or movie images corresponding to the corresponding pieces of the still image data or movie image data read by the reading means successively, following the one of the still images under display, whereby to make the slideshow display. The still image accepting means may also accept commands regarding display of the movie images.

A display control method according to the one aspect of the present invention includes the steps of: accepting commands regarding display of still images; when a command for a slideshow display of the still images has been accepted with one of the still images under display, reading, from a recording medium on which still image data being image data including a plurality of the still images are recorded in a predetermined order, corresponding pieces of the still image data successively, starting with a piece of the still image data next to a piece of the still image data corresponding to the one of the still images under display; and when a command for a slideshow display of the still images has been accepted with one of the still images under display, displaying still images corresponding to the corresponding pieces of the still image data read from the recording medium successively, following the one of the still images under display, whereby to make the slideshow display.

A display control program according to the one aspect of the present invention causes a computer to execute processing including the steps of: accepting commands regarding display of still images; when a command for a slideshow display of the still images has been accepted with one of the still images under display, reading, from a recording medium on which still image data being image data including a plurality of the still images are recorded in a predetermined order, corresponding pieces of the still image data successively, starting with a piece of the still image data next to a piece of the still image data corresponding to the one of the still images under display; and when a command for a slideshow display of the still images has been accepted with one of the still images under display, displaying still images corresponding to the corresponding pieces of the still image data read from the recording medium successively, following the one of the still images under display, whereby to make the slideshow display.

In the one aspect of the present invention, commands regarding display of still images are accepted, and when a command for a slideshow display of the still images has been accepted with one of the still images under display, corresponding pieces of still image data are read successively from a recording medium on which the still image data being image data including a plurality of the still images are recorded in a predetermined order, starting with a piece of the still image data next to a piece of the still image data corresponding to the one of the still images under display. Furthermore, when a command for a slideshow display of the still images has been accepted with one of the still images under display, the still images corresponding to the corresponding pieces of the still image data read from the recording medium are displayed successively, following the one of the still images under display, whereby to make the slideshow display.

As described above, according to the one aspect of the present invention, images can be displayed.

Furthermore, according to the one aspect of the present invention, a user can display a slideshow, starting with a desired still image.

BRIEF DESCRIPTION OF THE DRAWINGS

The present invention will become more readily appreciated and understood from the following detailed description of embodiments and examples of the present invention when taken in conjunction with the accompanying drawings, in which.

DESCRIPTION OF THE INVENTION

Embodiments of the present invention will be described below. The essential components of the present invention correspond, by way of example, to the embodiments described in the Specification or the drawings as follows. This description is to confirm that the embodiments supporting the present invention are described in the Specification or the drawings. Therefore, even if there is an embodiment which is described in the Specification or the drawings but not described herein as the embodiment corresponding to an essential component of the present invention, this does not mean that the embodiment does not correspond to the essential component. Conversely, even if an embodiment is described herein as corresponding to an essential component, this does not mean that the embodiment does not correspond to any essential component other than the essential component.

Figure 6:
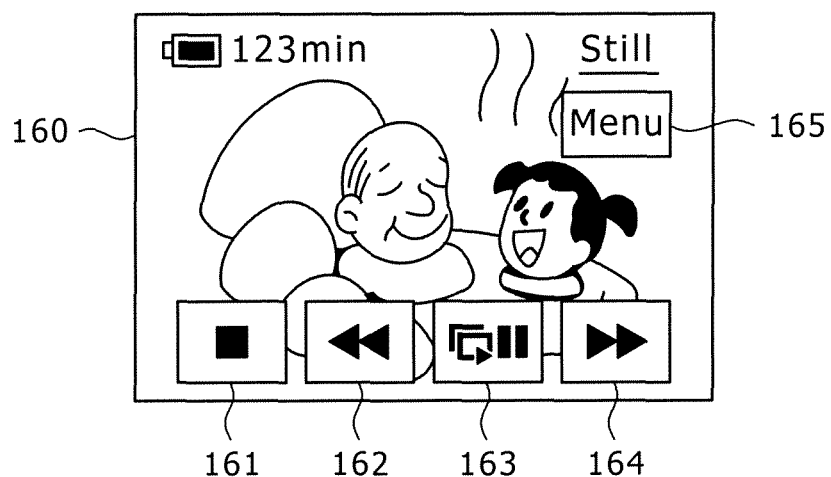
FIG. 6 is a diagram showing a screen example in which a still image is displayed.

First, a display control apparatus according to the one aspect of the present invention includes reading means (e.g., a recording reading control section 72 of FIG. 4) for reading still image data from a recording medium (e.g., a recording section 73 of FIG. 4) on which the still image data being image data of a plurality of still images are recorded in a predetermined order, display control means (e.g., an output control means 86 of FIG. 4) for displaying the still images corresponding to the still image data read by the reading means, and still image accepting means (e.g., still buttons including a stop button 161, a back button 162, a slideshow button 163, a forward button 164, and a Menu button 165 of FIG. 6) for accepting commands regarding display of the still images.

Figure 9:
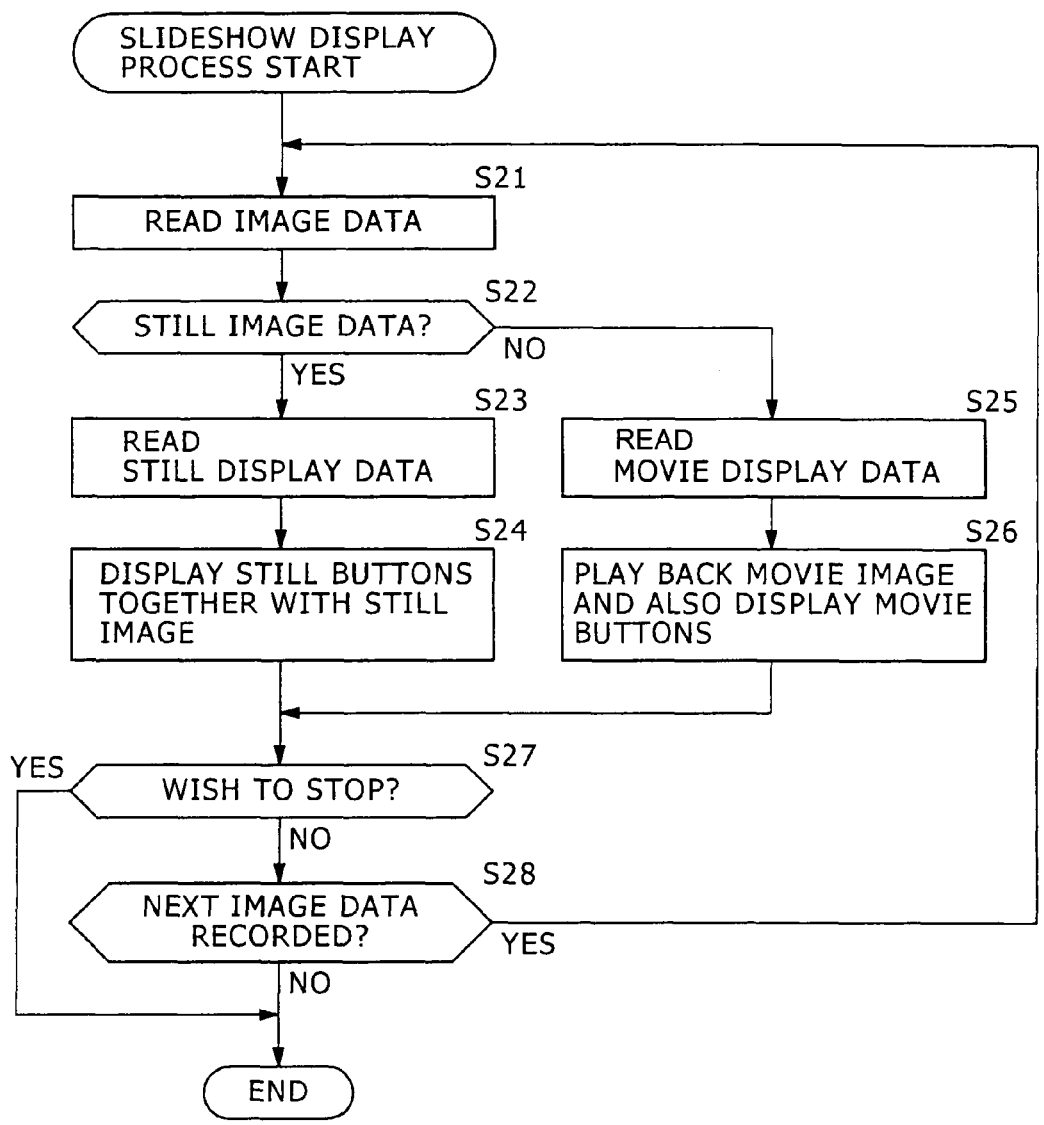
FIG. 9 is a flowchart illustrating a slideshow display process by the video camera of FIG. 4.

When a command for a slideshow display of the still images has been accepted by the still image accepting means with one of the still images under display, the reading means reads corresponding pieces of the still image data successively, starting with a piece of the still image data next to a piece of the still image data corresponding to the one of the still images under display (e.g., processing in step S21 of FIG. 9).

When a command for a slideshow display of the still images has been accepted by the still image accepting means with one of the still images under display, the display control means displays still images corresponding to the corresponding pieces of the still image data read by the reading means successively, following the one of the still images under display, whereby to make the slideshow display (e.g., processing in step S24 of FIG. 9).

Figure 7:
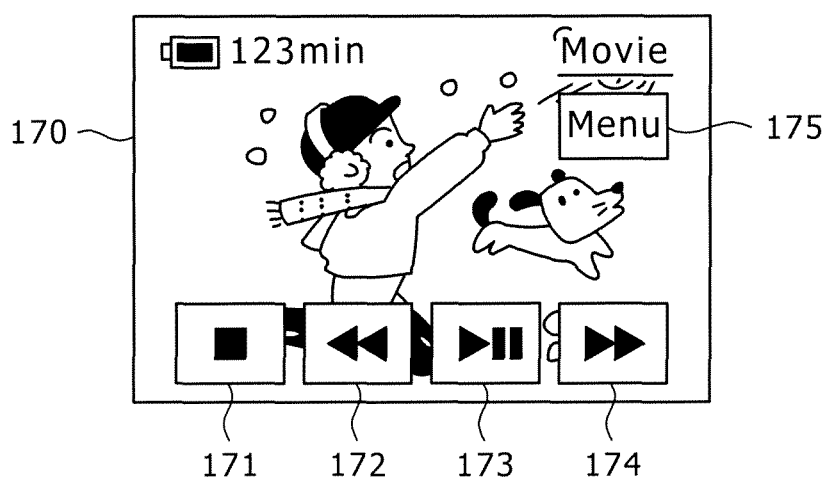
FIG. 7 is a diagram showing a screen example in which a movie image is displayed.

Second, the display control apparatus according to the one aspect of the present invention further includes movie image accepting means (e.g., movie buttons including a stop button 171, a rewind button 172, a play/pause button 173, a fast forward button 174, and a Menu button 175 of FIG. 7) for accepting commands regarding display of movie images.

The recording medium has the still image data and movie image data being image data of the movie images, recorded thereon in a plurality of pieces in a predetermined order.

When a command for a slideshow display of the still images has been accepted by the still image accepting means with one of the still images under display, the reading means reads corresponding pieces of the still image data or movie image data successively, starting with a piece of the still image data or movie image data next to a piece of the still image data corresponding to the one of the still images under display (e.g., step S21 of FIG. 9).

When a command for a slideshow display of the still images has been accepted by the still image accepting means with one of the still images under display, the display control means displays still images or movie images corresponding to the corresponding pieces of the still image data or movie image data read by the reading means successively, following the one of the still images under display, whereby to make the slideshow display, and displays the still image accepting means together with the one of the still images, and further displays the movie image accepting means together with one of the movie images (e.g., step S24 or S26 of FIG. 9).

A display control method or a program according to the one aspect of the present invention includes the steps of:

accepting commands regarding display of still images (e.g., step S27 of FIG. 9);

when a command for a slideshow display of the still images has been accepted with one of the still images under display, reading, from a recording medium on which still image data being image data of a plurality of the still images are recorded in a predetermined order, corresponding pieces of the still image data successively, starting with a piece of the still image data next to a piece of the still image data corresponding to the one of the still images under display (e.g., step S21 of FIG. 9); and when a command for a slideshow display of the still images has been accepted with one of the still images under display, displaying still images corresponding to the corresponding pieces of the still image data read from the recording medium successively, following the one of the still images under display, whereby to make the slideshow display (e.g., step S24 of FIG. 9).

Specific embodiments to which the present invention is applied will be described below in great detail with reference to the drawings.

Figure 3:
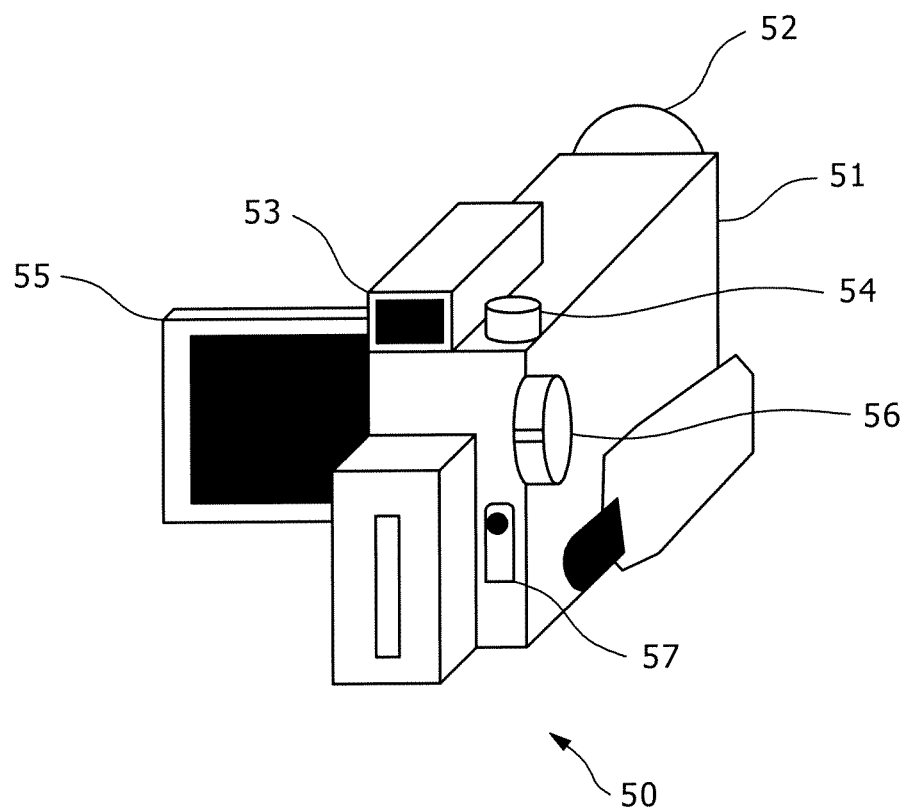
FIG. 3 is a perspective view showing an external configuration example of a video camera to which the present invention is applied.

FIG. 3 is a perspective view showing an external configuration example of a video camera 50 to which the present invention is applied.

The video camera 50 of FIG. 3 has, in the front (the back surface as viewed in the drawing) of a housing 51 thereof, a lens section 52 which passes light from an object therethrough. Also, on the upper surface of the housing 51, there are provided a viewfinder 53 on the left side and a still imaging button 54 on the right side. The viewfinder 53 displays a still image or movie image corresponding to the light having passed through the lens section 52. Furthermore, the still imaging button 54 is operated when imaging the object as a still image.

On the left-side surface of the housing 51 is a display section 55, which is formed by having a display section, such as a liquid crystal display, and a touch panel, both not shown, superposed one upon another. The liquid crystal display section 55 displays the still image or movie image corresponding to the light having passed through the lens section 52, operation buttons, and the like thereon. Since the display section 55 has the touch panel superposed thereon in this way, a user may only have to operate the operation buttons displayed on the display section 55, whereby the video camera 50 can provide the user with simple and sensuous operation.

Moreover, on the right surface of the housing 51 is a power button 56, which is operated to turn on the video camera 50.

Furthermore, on the back (the front surface as viewed in the drawing) of the housing 51 is a movie imaging button 57, which is operated to image the object as a movie image or to end the imaging.

Figure 4:
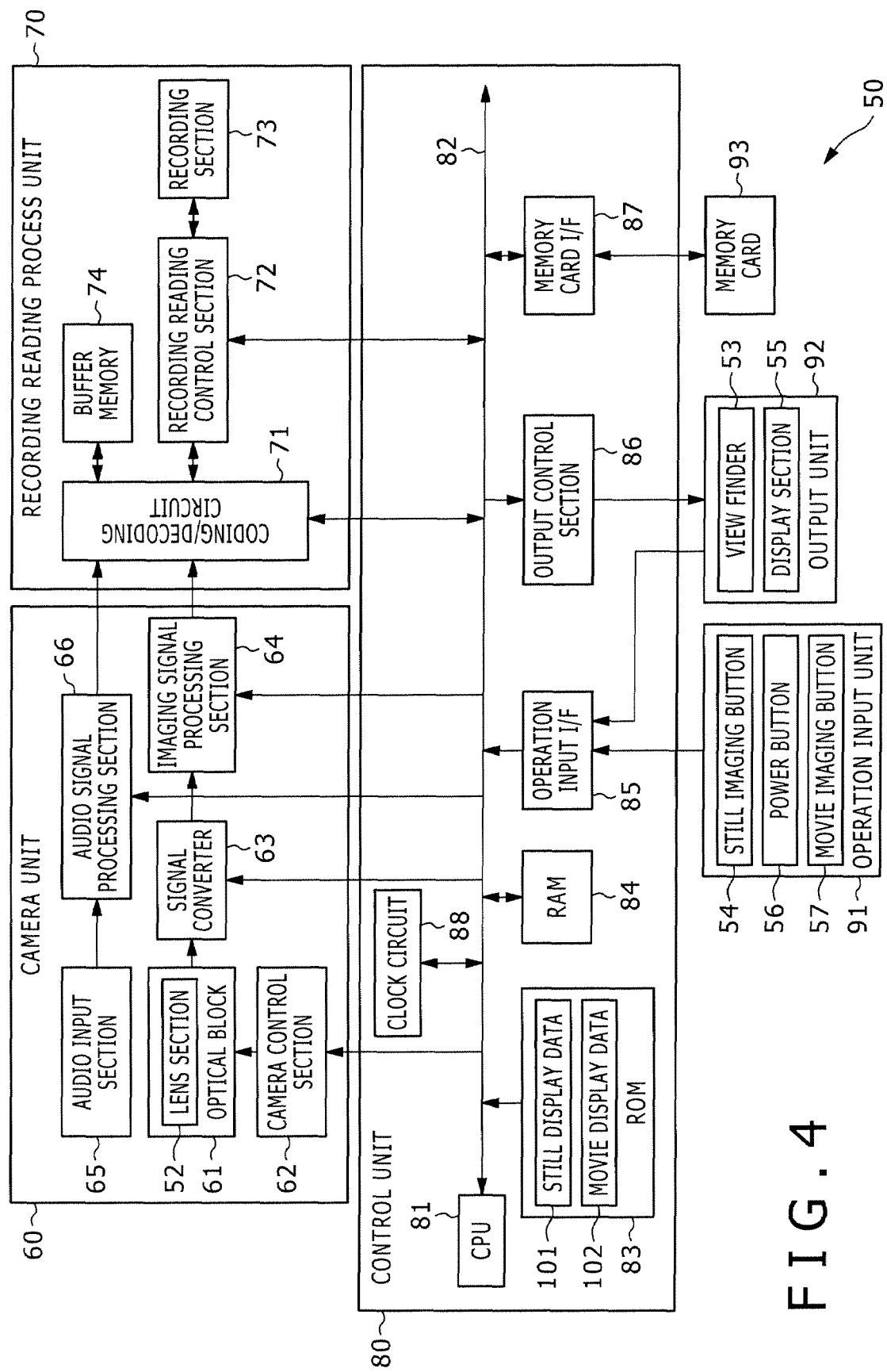
FIG. 4 is a diagram showing a configuration example of the video camera of FIG. 3.

FIG. 4 is a diagram showing a configuration example of the video camera 50 of FIG. 3.

The video camera 50 of FIG. 4 includes a camera unit 60, a recording reading processing unit 70, and a control unit 80.

The camera unit 60 includes an optical block 61, a camera control section 62, a signal converter 63, an imaging signal processing section 64, an audio input section 65, and an audio signal processing section 66.

The optical block 61 includes the lens section 52 of FIG. 3, an iris adjusting mechanism, a focus adjusting mechanism, a zoom mechanism, a shutter mechanism, a flash mechanism, a blurring correcting mechanism, and the like, all not shown, and is controlled by the camera control section 62. The optical block 61 supplies light reflected off the object to the signal converter 63.

The camera control section 62 controls the optical block 61 under the control of a CPU (Central Processing Unit) 81 of the control unit 80. The signal converter 63 is formed of an imaging device such as, e.g., a CCD (Charge Coupled Device), and causes the light from the optical block 61 to form an image on a light-receiving surface of the imaging device. The signal converter 63 converts the image of the object formed on the light-receiving surface into an imaging signal according to a timing signal representing an imaging timing, supplied thereto from the CPU 81, and supplies the imaging signal to the imaging signal processing section 64.

The imaging signal processing section 64 performs, under the control of the CPU 81, processing such as gamma correction, AGC (Automatic Gain Control), A/D (Analog/Digital) conversion, and the like on the imaging signal, and supplies image data on a movie image or still image being the resultant digital data, to the recording reading processing unit 70. The audio input section 65 acquires sound around the object at the time of the imaging, and supplies the resultant audio signal to the audio signal processing section 66.

The audio signal processing section 66 performs, under the control of the CPU 81, correction, AGC, A/D conversion, and the like on the audio signal, and supplies audio data being the resultant digital data, to the recording reading processing unit 70.

The recording reading processing unit 70 includes a coding/decoding circuit 71, a recording reading control section 72, a recording section 73, and a buffer memory 74.

The coding/decoding circuit 71 encodes, under the control of the CPU 81, the image data on the still image (hereinafter called still image data) supplied thereto from the imaging signal processing section 64 of the camera unit 60, using a predetermined coding scheme such as JPEG (Joint Photographic Experts Group) or the like. Then, the coding/decoding circuit 71 supplies still image data obtained by the encoding, to the recording reading control section 72 or a memory card I/F (interface) 87 of the control unit 80.

Also, the coding/decoding circuit 71 encodes, under the control of the CPU 81, the image data on the movie image (hereinafter called movie image data) supplied thereto from the imaging signal processing section 64 as well as the audio data supplied thereto from the audio signal processing section 66, using a predetermined coding scheme such as MPEG2 (Moving Picture Experts Group phase 2) or the like, while causing the buffer memory 74 to hold them temporarily. Then, the coding/decoding circuit 71 supplies movie image data (movie image data with audio) obtained by the encoding, to the recording reading control section 72 or the memory card I/F 87.

Note that still image data and movie image data will hereinafter be collectively called image data unless otherwise required to be distinguished from each other. Also, a still image and a movie image will be collectively called images unless otherwise required to be distinguished from each other.

Moreover, the coding/decoding circuit 71 decodes, under the control of the CPU 81, the image data supplied thereto from the recording reading control section 72 or the memory card I/F 87, and supplies the resultant still image data or movie image data with the audio data, to an output control section 86 of the control unit 80. Furthermore, the coding/decoding circuit 71 supplies the still image data or movie image data obtained by the decoding, to the CPU 81.

The recording reading control section 72 adds, under the control of the CPU 81, time information representing the current date/time supplied thereto from a clock circuit 88, to the still image data and the movie image data (the movie image data with audio) from the coding/decoding circuit 71, and causes the recording section 73 to record the image data with the time information added thereto in order of imaging (in order of date/time represented by time information). Also, the recording reading control section 72 reads, under the control of the CPU 81, the image data from the recording section 73, for supply to the coding/decoding circuit 71.

The recording section 73 includes, e.g., a DVD (Digital Versatile Disk), a hard disk, and the like, and records a program and the like to be executed by the CPU 81. This program is installed from, e.g., a memory card 93. The buffer memory 74 is formed of, e.g., an SDRAM (Synchronous Dynamic Random Access Memory) or the like, and temporarily holds the image data thereon.

The control unit 80 includes the CPU 81, a ROM (Read Only Memory) 83, a RAM (Random Access Memory) 84, an operation input I/F 85, the output control section 86, the memory card I/F 87, and the clock circuit 88. These components are interconnected via a bus 82. Note that the CPU 81, ROM 83, and RAM 84 may be formed of a microcomputer.

The CPU 81 controls the respective components according to the program recorded in the recording section 73 or the ROM 83, and performs various processes. Specifically, e.g., the CPU 81 generates a timing signal according to an imaging command inputted from an operation input unit 91, described later, via the operation input I/F 85, for supply to the signal converter 63 via the bus 82.

Also, the CPU 81 controls the recording reading control section 72 and the coding/decoding circuit 71 according to a command for displaying an image supplied thereto from the operation input unit 91, to supply image data on the image from the recording section 73 to the output control section 86 via the recording reading control section 72, coding/decoding circuit 71, and bus 82, and also to read, from the ROM 83, still display data 101 for displaying buttons (hereinafter called still buttons) for accepting commands regarding display of still images, or movie display data 102 for displaying buttons (hereinafter called movie buttons) for accepting commands regarding display of movie images, for supply to the output control section 86.

As a result, on an output unit 92, e.g., the still buttons are displayed together with the still image, and so are the movie buttons together with the movie image.

Furthermore, the CPU 81 creates thumbnail image data being still image data, on the basis of the still image data or, e.g., the first piece of movie image data supplied thereto from the coding/decoding circuit 71, for supply to the output control section 86.

The ROM 83 stores the still display data 101, movie display data 102, the program executed by the CPU 81, and the like. The RAM 84 stores data obtained from the processes performed by the CPU 81, and the like, as appropriate. The operation input unit 91 and the output unit 92 are connected to the operation input I/F 85. The operation input I/F 85 supplies a command supplied thereto from the operation input unit 91 and the output unit 92, to the CPU 81 via the bus 82.

The output control section 86 supplies the still image data, or movie image data with the audio data supplied thereto from the coding/decoding circuit 71, to the output unit 92, and also supplies the still display data 101 or movie display data 102 supplied thereto from the CPU 81, to the output unit 92. Also, the output control section 86 supplies the thumbnail image data supplied thereto from the CPU 81 to the output unit 92.

The memory card 93 is attached to the memory card I/F 87, as necessary. The memory card I/F 87 causes the memory card 93 to record thereon the image data from the coding/decoding circuit 71, under the control of the CPU 81. Also, the memory card I/F 87 reads image data from the memory card 93 for supply to the coding/decoding circuit 71, under the control of the CPU 81. The clock circuit 88 measures the current date/time, and supplies time information representing that date/time to the recording reading control section 72 via the bus 82.

The operation input unit 91 is formed of the still imaging button 54, power button 56, movie imaging button 57, and the like of FIG. 3. The operation input unit 91 accepts a command corresponding to a user operation, and supplies the command to the operation input I/F 85.

The output unit 92 is formed of the viewfinder 53, display section 55 of FIG. 3, a speaker, not shown, and the like. The viewfinder 53 displays an image corresponding to a piece of still image data or movie image data supplied thereto from the output control section 86. Furthermore, the display section 55 displays a Still icon corresponding to a piece of the still display data 101 or a Movie icon corresponding to a piece of the movie display data 102, together with the image corresponding to the piece of still image data or movie image data from the output control section 86.

Also, the display section 55 displays thumbnail images corresponding to the thumbnail image data from the output control section 86. Furthermore, the speaker outputs audio corresponding to the audio data supplied thereto from the output control section 86. Furthermore, the display section 55 accepts a user operation over the touch panel, and supplies a command corresponding to the operation to the operation input I/F 85.

Note that the still display data 101 and the movie display data 102 have been described as being recorded on the ROM 83 in FIG. 4. However, they may be recorded on the recording section 73, instead. In this case, the still display data 101 and the movie display data 102 may be recorded on the recording section 73 beforehand, or the still display data 101 and the movie display data 102 already recorded on the memory card 93 may be read for subsequent recording on the recording section 73.

Also, image data obtained by imaging with the camera section 60 are hereinafter supposed to be recorded on the recording section 73, for convenience of explanation.

Figure 5:
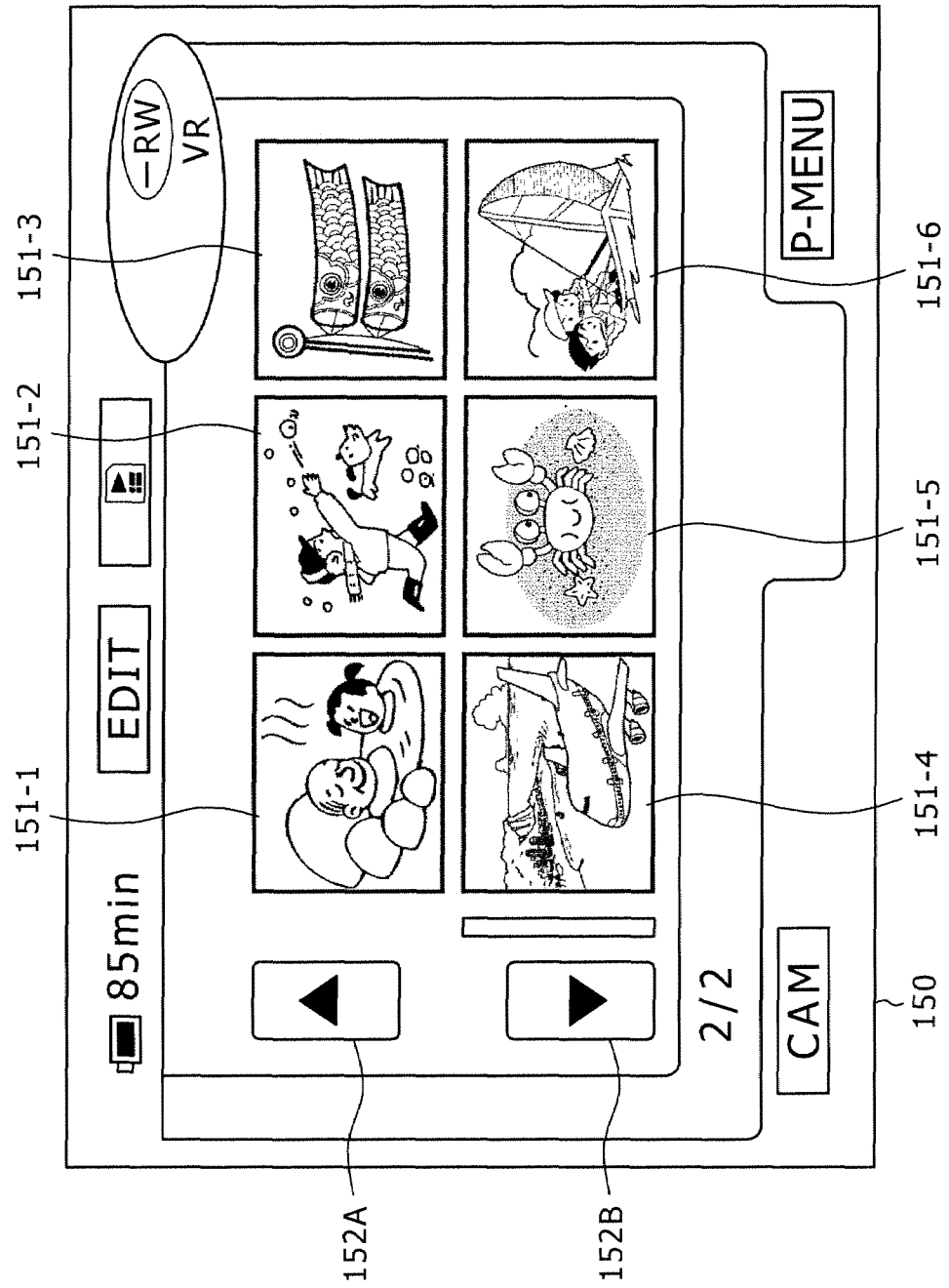
FIG. 5 is a diagram showing a screen example in which images are displayed as an index.

FIG. 5 shows a screen example in which the images corresponding to the image data recorded on the recording section 73 of FIG. 4 are displayed on the display section 55.

In the example of FIG. 5, six thumbnail images 151-1 to 151-6 are displayed as an index in an arrangement of 3 (columns)×2 (rows) on a screen 150. The thumbnail image 151-1 and the thumbnail images 151-3 to 151-5 correspond to the still image data, whereas the thumbnail images 151-2 and 151-6 correspond to the movie image data.

Note that the thumbnail images 151-1 to 151-6 will hereinafter be collectively called thumbnail images 151 unless otherwise required to be individually distinguished.

Moreover, the thumbnail images 151 are arranged in order of earlier date/time represented by the time information added to the image data corresponding to the thumbnail images 151, i.e., in order of imaging, rightward from the upper left, with the lower rightmost thumbnail image 151-6 being the thumbnail image 151 corresponding to the last one of the six thumbnail images 151-1 to 151-6 in order of imaging.

Also on the screen 150, an up button 152A and a down button 152B are shown on the left side of the six thumbnail images 151. The (position on the touch panel corresponding to the) up button 152A is operated (pressed) to display, as an index, thumbnail images corresponding to previous six images which have been imaged (acquired) immediately before the six thumbnail images 151 now under display. The down button 152B is operated to display, as an index, thumbnail images corresponding to next six images which have been imaged immediately after the six thumbnail images 151 now under display.

The user touches (presses) (the position on the display section 55 corresponding to) a desired one of the six thumbnail images being displayed as an index on the screen 150, with a finger or the like.

For example, where the user has selected a thumbnail image 151 (the thumbnail image 151-1 in an example of FIG. 6) corresponding to a piece of still image data by pressing the thumbnail image 151, a screen shown in FIG. 6 is displayed on the display section 55.

On a screen 160 of FIG. 6, a still image corresponding to the thumbnail image 151-1, and also the still buttons are displayed. Specifically, at the lower part of the screen 160, the stop button 161, back button 162, slideshow button 163, and forward button 164 are displayed as still buttons, whereas at the upper right of the screen 160, the Menu button 165 is displayed as a still button.

The stop button 161 is operated to stop display of the screen 160. The back button 162 is operated to select for display a previous image which has been imaged immediately before the still image now under display on the screen 160. The slideshow button 163 is operated to start a slideshow display with the still image now under display on the screen 160 to successively show the subsequent images in order of imaging, or stop the slideshow display. Namely, the slideshow button 163 accepts a command for starting or stopping a slideshow display from the user.

For example, if the still image corresponding to the thumbnail image 151-1 is displayed on the screen 160 with no slideshow running, and when the user has operated the slideshow button 163, the images are displayed one after another, following the still image corresponding to the thumbnail image 151-1, in order of a movie image corresponding to the thumbnail image 151-2, a still image corresponding to the thumbnail image 151-3, a still image corresponding to the thumbnail image 151-4, a still image corresponding to the thumbnail image 151-5, and a movie image corresponding to the thumbnail image 151-6, and so on.

The forward button 164 is operated to select for display a next image which has been imaged immediately after the still image now under display on the screen 160. Furthermore, the Menu button 165 is operated to select various menu items.

Note that if the image selected for display with the back button 162 or the forward button 164 is a still image, the screen 160 showing the still image thereon is displayed, whereas if the selected image is a movie image, a screen 170 of FIG. 7, described later, which shows the movie image thereon is displayed.

Figure 1:
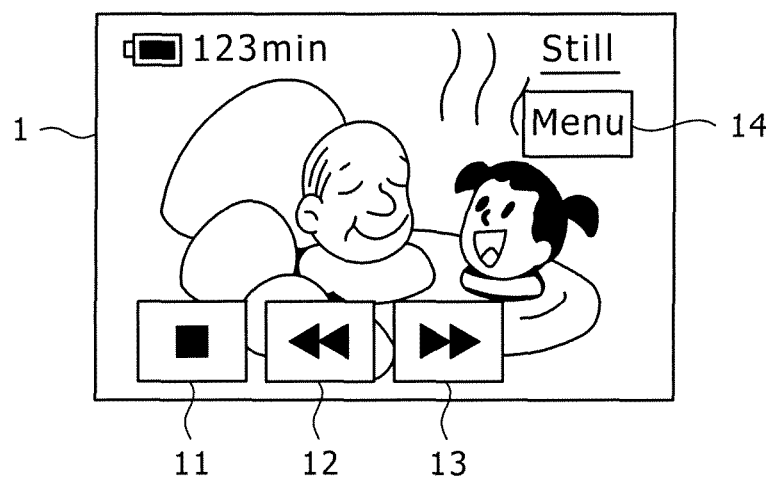
FIG. 1 is a diagram illustrating a conventional method example for commanding a slideshow display.
Figure 2:
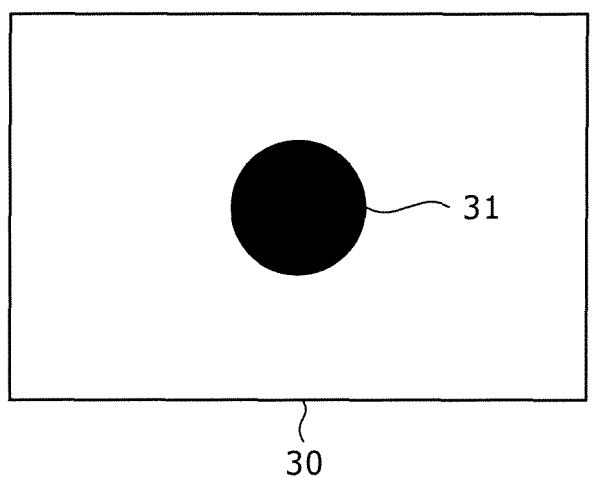
FIG. 2 is a diagram illustrating another conventional method example for commanding a slideshow display.

As described above, the slideshow button 163 is displayed on the display section 55 together with a still image. Thus, the user can command a slideshow display start or stop more easily than the case where the user must first operate the Menu button 14 and then further select the slideshow display item from the menu as shown in FIG. 1.

Meanwhile, where the user has selected a thumbnail image 151 (the thumbnail image 151-2 in an example of FIG. 5) corresponding to a piece of movie image data by pressing the thumbnail image 151 on the screen 150 of FIG. 5, the screen shown in FIG. 7 is displayed on the display section 55.

On the screen 170 of FIG. 7, the movie image corresponding to the thumbnail image 151-2 is displayed, and so are the movie buttons. Specifically, at the lower part of the screen 170, the stop button 171, rewind button 172, play/pause button 173, and fast forward button 174 are displayed as movie buttons, whereas at the upper right of the screen 170, the Menu button 175 is displayed as a movie button.

The stop button 171 is operated to stop display of the screen 170. The rewind button 172 is operated to play back by rewinding the movie image now under display on the screen 170 from that timing. Here, the term "to play back" means displaying the movie image at a normal speed in the forward direction from a certain timing, whereas the term "to play back by rewinding" means displaying the movie image at a speed faster than the normal speed in the backward direction from a certain timing. Furthermore, a term "to play back by fast forwarding", described later, means displaying the movie image at a speed faster than the normal speed in the forward direction from a certain timing.

If the user has operated the rewind button 172 to play back the movie image by rewinding to the start but thereafter presses neither the stop button 171 nor the play/pause button 173, a previous image which has been imaged immediately before that movie image is displayed. Specifically, if the previous image which has been imaged immediately before the movie image is a still image, the screen 160 (FIG. 6) showing the still image thereon is displayed, whereas if the previous image is a movie image, the movie image is played back by rewinding on the screen 170.

The play/pause button 173 is operated to play back the movie image now pausing on the screen 170 from that timing, or to stop the current playback by rewinding, playback, and playback by fast forwarding. The fast forward button 174 is operated to play back the movie image now under display on the screen 170 by fast forwarding from that timing.

If the user has operated the play/pause button 173 or the fast forward button 174 to play back normally or by fast forwarding a movie image to the end but thereafter presses neither the stop button 171 nor the play/pause button 173, a next image which has been imaged immediately after the movie image is displayed. Specifically, if the next image which has been imaged immediately after the movie image is a still image, the screen 160 (FIG. 6) showing the still image thereon is displayed, whereas if the next image is a movie image, the movie image is played back normally or by fast forwarding on the screen 170.

Furthermore, the Menu button 175 is operated to select various menu items.

Note that the still buttons shown in FIG. 6 and the movie buttons shown in FIG. 7 are arranged in the same way. Namely, the stop buttons 161 and 171, the back button 162 and the rewind button 172, the slideshow button 163 and the play/pause button 173, the forward button 164 and the fast forward button 174, the Menu buttons 165 and 175 are designed to be laid out at the same positions on the screens of the display section 55, respectively.

As a result, the user can feel the same way in the operation both when a still image is displayed and when a movie image is displayed, whereby user operability can be enhanced.

Figure 8:
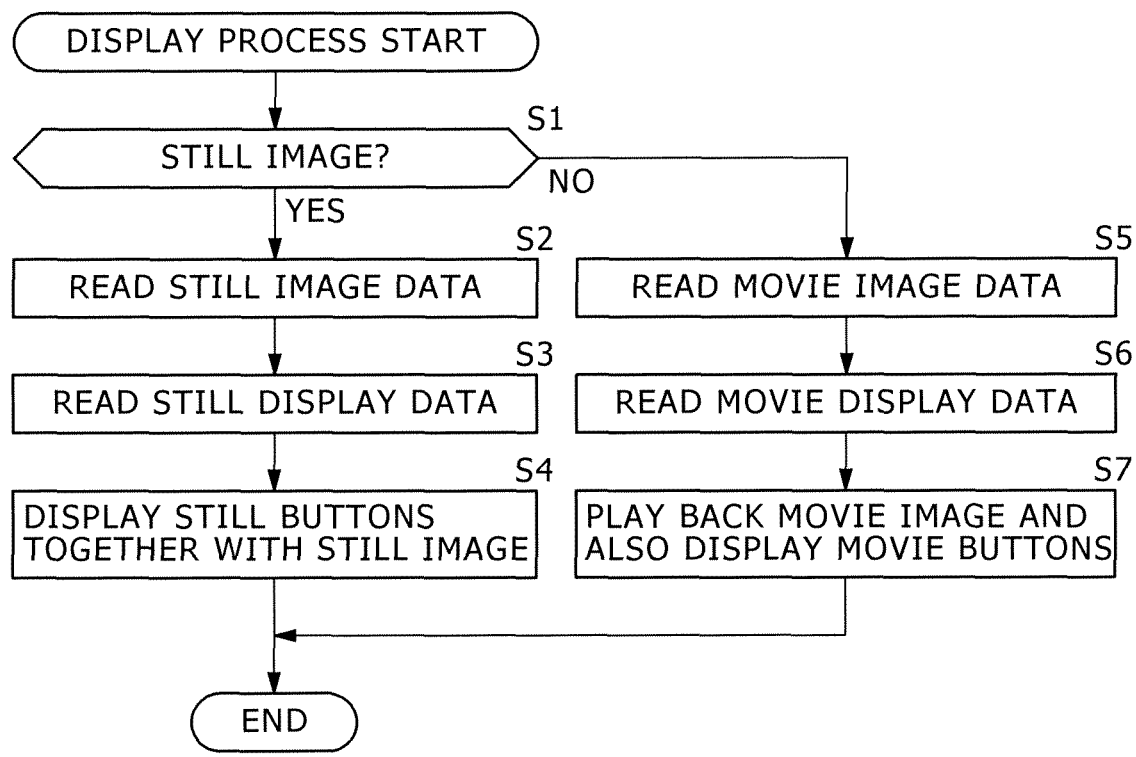
FIG. 8 is a flowchart illustrating a display process by the video camera of FIG. 4.

Referring next to FIG. 8, a display process will be described, by which the camera 50 of FIG. 4 displays an images recorded on the recording section 73. This display process is started when the user has selected a thumbnail image 151 by pressing any one of the thumbnail images 151 on the screen 150 of FIG. 5.

In step S1, the CPU 81 determines, according to a command for displaying an image corresponding to the thumbnail image 151 selected by the user, supplied thereto from the display section 55 via the operation input I/F 85, whether or not the image is a still image.

If it has been determined in step S1 that the image corresponding to the thumbnail image 151 selected by the user is a still image, the process proceeds to step S2, where the recording reading control section 72 reads, under the control of the CPU 81, a piece of still image data on the still image from the recording section 73, for supply to the output control section 86 via the coding/decoding circuit 71.

After having processed step S2, the process proceeds to step S3, where the CPU 81 reads the still display data 101 from the ROM 83, for supply to the output control section 86, after which the process proceeds to step S4. In step S4, the output control section 86 supplies the piece of still image data supplied thereto from the coding/decoding circuit 71 and the still display data 101 supplied thereto from the CPU 81, to the display section 55, to cause the display section 55 to display the still buttons thereon together with the corresponding still image. As a result, the screen 160 shown in FIG. 6 is displayed on the display section 55.

Meanwhile, if it has been determined in step S1 that the image corresponding to the thumbnail image 151 selected by the user is not a still image, i.e., that the image corresponding to the thumbnail image 151 selected by the user is a movie image, the process proceeds to step S5, where the recording reading control section 72 reads, under the control of the CPU 81, a piece of movie image data on the movie image from the recording section 73, for supply to the output control section 86 via the coding/decoding circuit 71.

After having processed step S5, the process proceeds to step S6, where the CPU 81 reads the movie display data 102 from the ROM 83, for supply to the output control section 86, after which the process proceeds to step S7. In step S7, the output control section 86 supplies the piece of movie image data supplied thereto from the coding/decoding circuit 71 and the movie display data 102 supplied thereto from the CPU 81, to the display section 55, to play back the corresponding movie image and also to cause the display section 55 to display the movie buttons thereon. As a result, the screen 170 shown in FIG. 7 is displayed on the display section 55.

Referring next to FIG. 9, a slideshow display process will be described, by which the video camera 50 of FIG. 4 displays a slideshow. This slideshow display process is started, e.g., if a slideshow display is not started yet, and when the user has operated the slideshow button 163 on the screen 160 of FIG. 6.

In step S21, the CPU 81 controls the recording reading control section 72, according to the command for a slideshow display corresponding to the user operating the slideshow button 163, supplied thereto from the display section 55 via the operation input I/F 85, to read from the recording section 73 a piece of image data next to the piece of still image data on the still image now under display on the screen 160, and then to supply the next piece of image data read to the output control section 86 via the coding/decoding circuit 71.

After having processed step S21, the process proceeds to step S22, where the CPU 81 determines whether or not the piece of image data read in step S21 is a piece of still image data, and if it has been determined that the piece of image data read is a piece of still image data, the process proceeds to step S23.

In step S23, the CPU 81 reads the still display data 101 from the ROM 83, for supply to the output control section 86, after which the process proceeds to step S24. In step S24, the output control section 86 supplies the piece of still image data supplied thereto from the coding/decoding circuit 71 and the still display data 101 supplied thereto from the CPU 81, to the display section 55, to cause the display section 55 to display the still buttons thereon together with the corresponding still image. As a result, the screen 160 shown in FIG. 6 is displayed on the display section 55.

Meanwhile, if it has been determined in step S22 that the piece of image data read is not a piece of still image data, but is a piece of movie image data, the process proceeds to step S25, where the CPU 81 reads the movie display data 102 from the ROM 83, for supply to the output control section 86, after which the process proceeds to step S26.

In step S26, the output control section 86 supplies the piece of movie image data supplied thereto from the coding/decoding circuit 71 and the movie display data 102 supplied thereto from the CPU 81, to the display section 55, to play back the corresponding movie image and also to cause the display section 55 to display the movie buttons thereon. As a result, the screen 170 shown in FIG. 7 is displayed on the display section 55.

After having processed step S24 or step S26, the process proceeds to step S27, where the display section 55 determines whether or not the slideshow display is to be stopped, i.e., whether or not the stop button 161 or 171, or the slideshow button 163 or the play/pause button 173 has been operated, and if any of these buttons has been determined operated, i.e., if it has been determined that the slideshow display is to be stopped, the process ends. Note that if the stop button 161 or 171 has been determined operated, the output control section 86 stops display of the screen 160 or 170 after the slideshow display process has ended.

Meanwhile, if it has been determined in step S27 that the slideshow display is not to be stopped, the process proceeds to step S28, where the CPU 81 controls the recording reading control section 72 to determine whether or not a piece of image data next to the piece of image data read immediately before in step S21 is recorded on the recording section 73.

If it has been determined in step S28 that the next piece of image data is recorded, the process returns to step S21, to repeat the above-mentioned processing. As a result, both still images and movie images are displayed as a slideshow on the display section 55.

On the other hand, if it has been determined in step S28 that the next piece of image data is not recorded, i.e., if the image under display (playback) is an image obtained by the last imaging, the process ends.

As described above, if the slideshow button 163 has been operated, the video camera 50 starts a slideshow display with a still image under display, and thus the user can run a slideshow, starting with a desired still image by operating the slideshow button 163 when the desired still image is under display. Also, the user can command a slideshow display as he or she feels like commanding a playback of a movie.

Referring next to FIGS. 10 to 14, another embodiment of a video camera to which the present invention is applied will be described.

Figure 10:
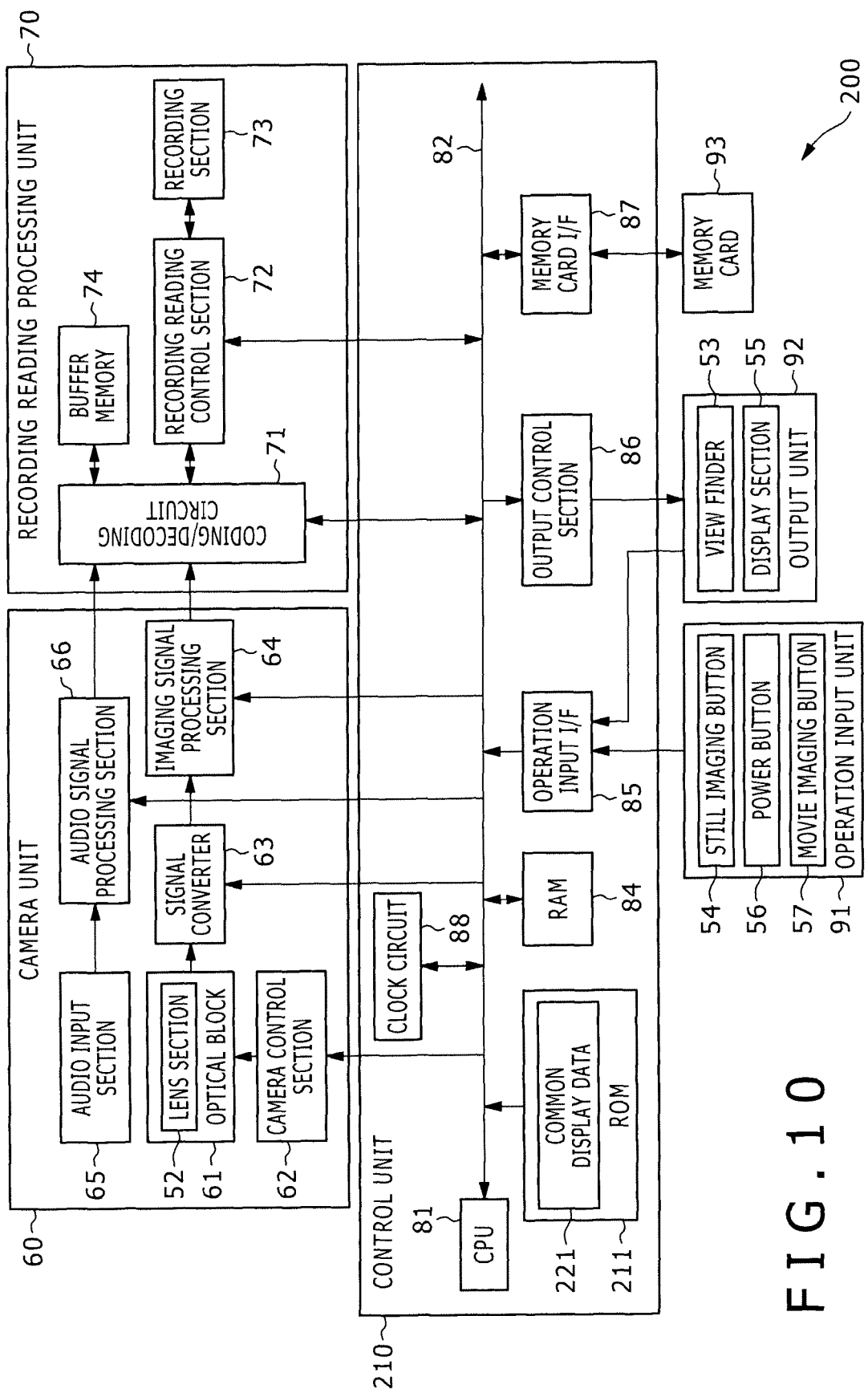
FIG. 10 is a block diagram showing a configuration example of another embodiment of a video camera to which the present invention is applied.

FIG. 10 is a block diagram showing a configuration example of another embodiment of a video camera to which the present invention is applied.

A video camera 200 of FIG. 10 includes the camera unit 60, the recording reading processing unit 70, and a control unit 210, and causes the display section 55 to display common buttons (hereinafter called common buttons) for accepting commands regarding display of still images and movie images, together with an image, irrespective of whether or not the image displayed on the display section 55 is a still image or a movie image. Note that the same parts and components as in FIG. 4 are denoted by the same reference numerals, and their descriptions are omitted due to being a repetition.

The control unit 210 of FIG. 10 is provided with a ROM 211, instead of the ROM 83 of the control unit 80 of FIG. 4.

The ROM 211 stores common display data 221 for displaying the common buttons, a program executed by the CPU 81, and the like.

Figure 11:
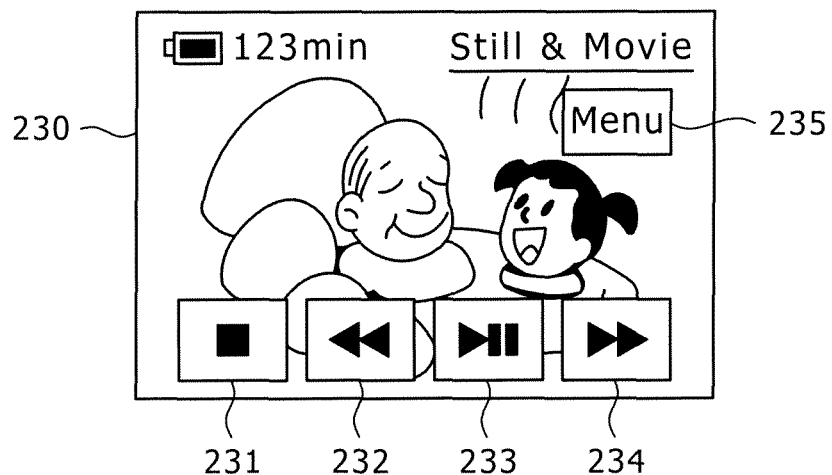
FIG. 11 is a diagram showing a screen example in which an image is displayed in the video camera of FIG. 10.

Referring next to FIG. 11, a screen example will be described, which is displayed on the display section 55 when the user has pressed a desired thumbnail image 151.

On a screen 230 of FIG. 11, an image corresponding to the thumbnail image 151 is displayed, and so are the common buttons. Specifically, at the lower part of the screen 230, a stop button 231, a back/rewind button 232, a slideshow/play/pause button 233, and a forward/fast forward button 234 are displayed as common buttons, and also at the upper right of the screen 230, a Menu button 235 is displayed as a common button.

The stop button 231 has both functions as the stop button 161 of FIG. 6 and the stop button 171 of FIG. 7, and the back/rewind button 232 has both functions as the back button 162 and the rewind button 172. Also, the slideshow/play/pause button 233 has both functions as the slideshow button 163 and the play/pause button 173, and the forward/fast forward button 234 has both functions as the forward button 164 and the fast forward button 174. Furthermore, the Menu button 235 has both functions as the Menu buttons 165 and 175.

Note that the common buttons for accepting the commands regarding display of still images and movie images are displayed on the display section 55 together with an image, as mentioned above. Thus, if a common button has been operated by the user, the CPU 81 determines whether or not the image displayed together with the common buttons is a still image or a movie image according to a command corresponding to the operation, supplied thereto from the display section 55, and performs a process corresponding to the command on the basis of the determination result.

Figure 12:
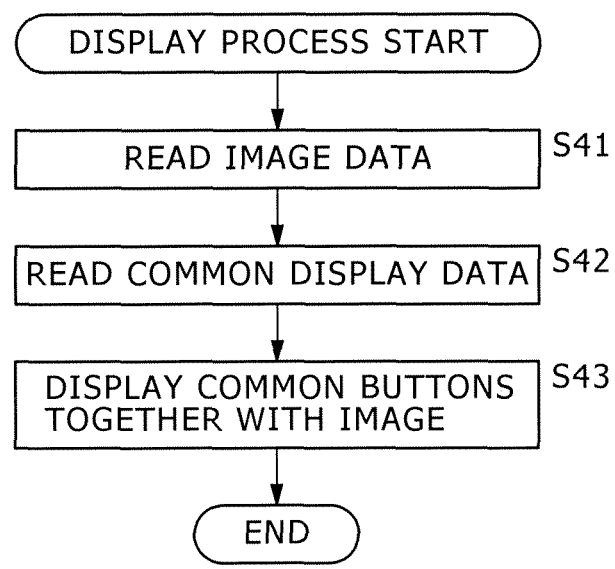
FIG. 12 is a flowchart illustrating a display process by the video camera of FIG. 10.

Referring next to FIG. 12, a display process will be described, by which the video camera 200 of FIG. 10 displays an image recorded on the recording section 73. This display process is started, e.g., when the user has selected a thumbnail image 151 by pressing any one of the thumbnail images 151 on the screen 150 of FIG. 5.

In step S41, the recording reading control section 72 reads, under the control of the CPU 81, a piece of image data on an image corresponding to the thumbnail image 151 selected by the user, from the recording section 73, and supplies the piece of image data read to the output control section 86 via the coding/decoding circuit 71.

After having processed step S41, the process proceeds to step S42, where the CPU 81 reads the common display data 221 from the ROM 83, for supply to the output control section 86, after which the process proceeds to step S43. In step S43, the output control section 86 supplies the piece of image data supplied thereto from the coding/decoding circuit 71 and the common display data 221 supplied thereto from the CPU 81, to the display section 55, to cause the display section 55 to display thereon the common buttons together with the corresponding image. As a result, the screen 160 shown in FIG. 11 is displayed on the display section 55.

Figure 13:
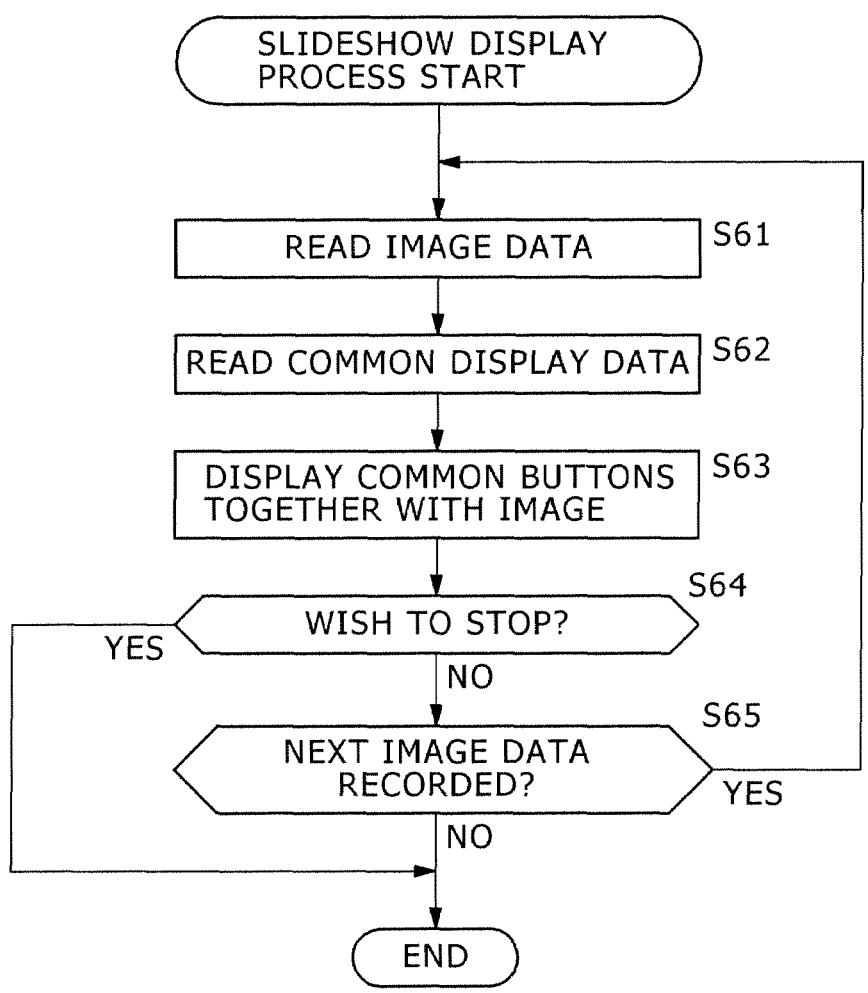
FIG. 13 is a flowchart illustrating a slideshow display process by the video camera of FIG. 10.

Referring next to FIG. 13, a slideshow display process will be described, by which the video camera 200 of FIG. 10 displays a slideshow. This slideshow display process is started, e.g., if a slideshow display is not yet started, and when the user has operated the slideshow/play/pause button 233 on the screen 230 of FIG. 11 with a still image under display.

In step S61, the CPU 81 controls the recording reading control section 72 to read from the recording section 73 a piece of image data next to the piece of still image data on the still image now under display on the screen 230, and to supply the next piece of image data read to the output control section 86 via the coding/decoding circuit 71, according to the command for a slideshow display corresponding to the user operation wih the slideshow/play/pause button 233, supplied thereto from the display section 55 via the operation input I/F 85.

After having processed step S61, the process proceeds to step S62, where the CPU 81 reads the common display data 221 from the ROM 211 for supply to the output control section 86, after which the process proceeds to step S63. In step S63, the output control section 86 supplies the piece of image data supplied thereto from the coding/decoding circuit 71 and the common display data 221 supplied thereto from the CPU 81 to the display section 55, to cause the display section 55 to display thereon the common buttons together with the corresponding image. As a result, the screen 230 shown in FIG. 11 is displayed on the display section 55.

After having processed step S63, the process proceeds to step S64, where the display section 55 determines whether or not the slideshow display is to be stopped, i.e., whether or not the stop button 230 or the slideshow/play/pause button 233 has been operated, and if any of these buttons has been determined operated, i.e., if it has been determined that the slideshow display is to be stopped, the process ends. Note that the output control section 86 stops display of the screen 230 after the slideshow display process has ended, if the stop button 230 has been determined operated.

Meanwhile, if it has been determined in step S64 that the slideshow display is not to be stopped, the process proceeds to step S65, where the CPU 81 controls the recording reading control section 72 to determine whether or not a piece of image data next to the piece of image data read immediately before in step S61 is recorded on the recording section 73.

If it has been determined in step S65 that the next piece of image data is recorded, the process returns to step S61 to repeat the above-mentioned processing.

On the other hand, if it has been determined in step S65 that the next piece of image data is not recorded, the process ends.

Note that when an image corresponding to a piece of image data is displayed, the common buttons are also displayed together with the image in the above-mentioned description. However, the common buttons may be displayed together with images when the images are displayed as an index as shown in FIG. 14.

Figure 14:
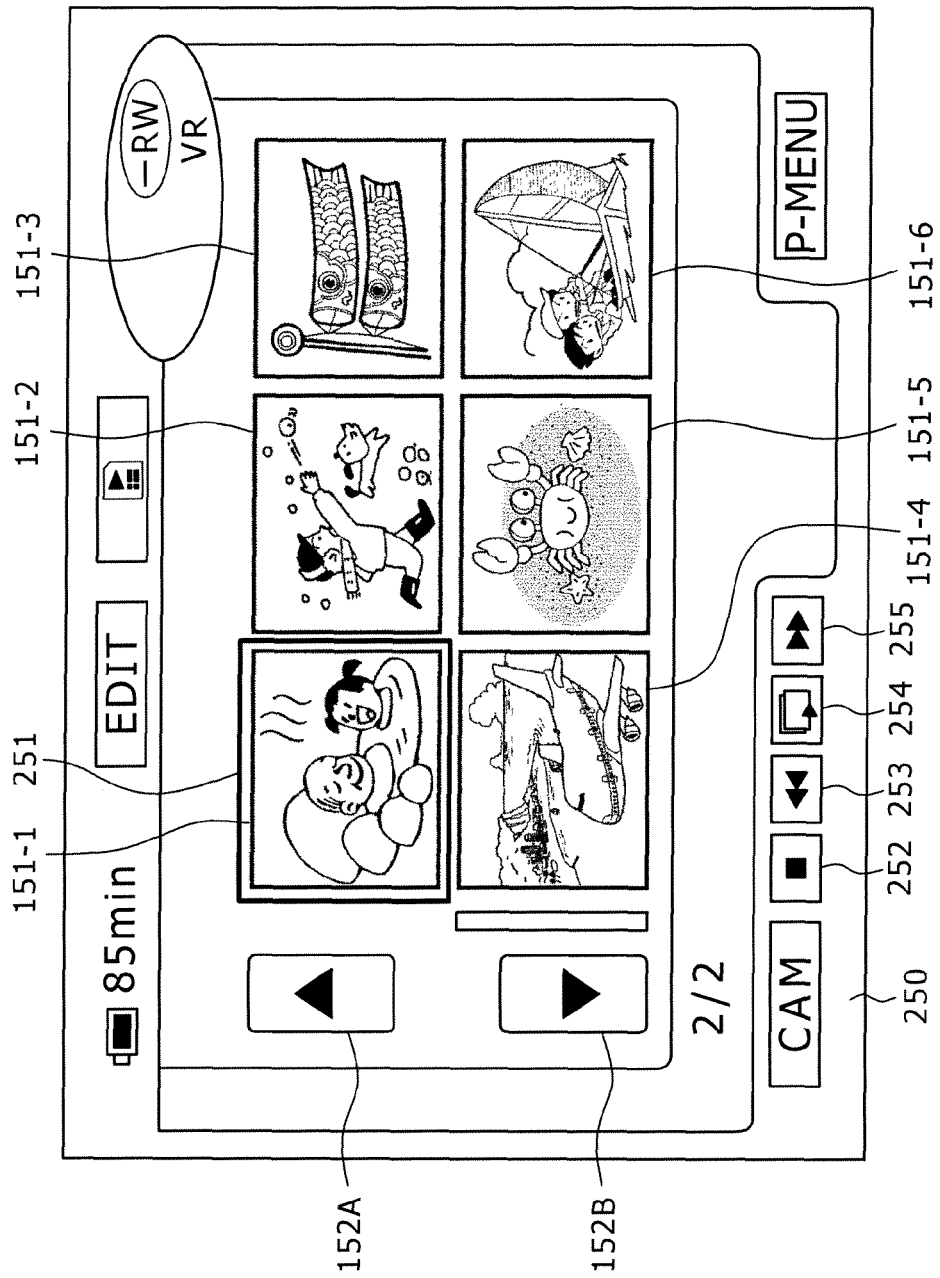
FIG. 14 is a diagram showing another screen example in which images are displayed in the video camera of FIG. 10.

A screen 250 of FIG. 14 is formed by displaying a cursor 251 and common buttons on the screen 150 of FIG. 5.

Namely, on the screen 250 of FIG. 14, the cursor 251 is placed on a user-selected one of the six thumbnail images 151.

Furthermore, on the screen 250 of FIG. 14, a stop button 252, a backward move button 253, a slideshow button 254, and a forward move button 255 are displayed as the common buttons.

The stop button 252 is operated to stop display of the screen 250. The backward move button 253 is operated to move the cursor 251 to the thumbnail image 151 of a previous image which has been imaged immediately before the image corresponding to a thumbnail image 151 on which the cursor 251 is placed. For example, if the cursor 251 is placed on the thumbnail image 151-2, and when the user has operated the backward move button 253, the cursor 251 is moved to be placed on the thumbnail image 151-1.

The slideshow button 254 is operated to command a slideshow display starting with an image 151 on which the cursor 251 is now placed. The forward move button 255 is operated to move the cursor 251 to the thumbnail image 151 of a next image which has been imaged immediately after the image corresponding to a thumbnail image 151 on which the cursor 251 is currently placed. For example, if the cursor 251 is placed on the thumbnail image 151-2, and when the user has operated the forward move button 255, the cursor 251 is moved to be placed on the thumbnail image 151-3.

As described above, the video camera 200 displays the common buttons having both functions as the still buttons and the movie buttons, whereby the amount of display data for displaying the buttons, which is to be stored on the ROM 211, can be reduced.

Furthermore, the video camera 200 no longer needs to determine whether or not the image corresponding to the thumbnail image 151 selected by the user is a still image, whereby the display processing speed can be enhanced.

Note that the display section 55 is formed by using a touch panel in the above-mentioned description, but that the touch panel is not an essential element of the invention. Namely, for example, it may be configured to use the operation input unit 91 instead of using the operation buttons shown on the display section 55.

Furthermore, in the above-mentioned description, the video camera 50 (200) is provided with various buttons by displaying the various buttons (the movie buttons, still buttons, common buttons) on the display section 55. However, the various buttons may be provided alternatively on the housing 51 of the video camera 50 (200).

If the common buttons are provided on the housing 51, the number of buttons provided on the housing 51 can be reduced compared with the case where the movie buttons and the still buttons are provided on the housing 51. Furthermore, if the various buttons are provided on the display section 55, the manufacturing cost of the video camera 50 can be reduced compared with the case where they are provided on the housing 51.

Furthermore, the images corresponding to the image data recorded on the recording section 73 are displayed on the display section 55 in the above-mentioned description. However, similar processing is performed even in a case where images corresponding to image data recorded on the memory card 93 are displayed on the display section 55.

Furthermore, it may also be configured to display images corresponding to image data recorded on both the recording section 73 and the memory card 93, on the display section 55. In this case, the CPU 81 sorts the image data recorded on both the recording section 73 and the memory card 93 in order of date/time represented by the time information added to the image data, i.e., in order of their imaging. As a result, the output unit 92 can display the images corresponding to the image data recorded on both the recording section 73 and the memory card 93, in order of their imaging.

Furthermore, in the above-mentioned description, it has been configured such that if a thumbnail image 151 corresponding to a movie image has been selected on the screen 150 of FIG. 5, the movie image is played back on the screen 170 of FIG. 7 or on the screen 230 of FIG. 11. However, it may alternatively be configured such that only the first still image of the movie image is displayed.

The present invention is applicable to not only video cameras but also, e.g., apparatus having a function of displaying images such as digital still cameras, personal computers, and portable telephones.

Note that in the present specification, the steps describing a program stored on a program recording medium includes not only processing performed time-sequentially along the sequence described, but also processing performed parallelly or individually, if not necessarily time-sequentially.

The present invention contains subject mater related to Japanese Patent Application No. JP2005-378839 filed in the Japanese Patent Office on Dec. 28, 2005, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus comprising:
   circuitry configured to:
   read still image data from a recording medium on which the still image data, corresponding to still images, is recorded in a first predetermined order and on which movie image data, corresponding to movie images, is recorded in a second predetermined order;
   accept commands regarding display of the movie images;
   display, on a display device, the still images corresponding to the still image data and the movie images corresponding to the movie image data read in the reading; and
   accept commands regarding display of the still images, one of the commands specifying a selected still image,
   wherein when a command for a slideshow display of the still images has been accepted, displaying both still images and movie images in a consecutive order of imaging with the selected still image being a starting point for the slideshow display during the same slideshow display,
   displaying an input area including each of the displayed still images, the input area including still buttons overlaid on each of the displayed still images that, when selected, perform operations with respect to viewing the displayed still images, and displaying an input area including each of the displayed movie images, the input area including movie buttons overlaid on each of the displayed movie images that, when selected, perform operations with respect to viewing the displayed movie images, the still buttons including a forward button that selects a next image that is located at the same position as a button that selects fast forwarding included in the movie buttons, a button that stops the slideshow that is located at the same position as a button that stops playback of one of the displayed movie images included in the movie buttons, a button that selects a previous image that is located at the same position as a button that rewinds the one of the displayed movie images included in the movie buttons, and a button that initiates the slideshow that is located at the same position as a button that plays and pauses the one of the displayed movie images included in the movie buttons, each of the still buttons and each of the movie buttons being displayed independently of selecting a menu button, and
   each of the still images being selectable as the starting point of the slideshow display.

2. The display control apparatus according to claim 1, wherein
   the recording medium has the still image data and movie image data recorded in a second predetermined order,
   when the command for the slideshow display of the still images has been accepted, the circuitry is further configured to display still images or movie images corresponding to the still image data or movie image data in the consecutive order of imaging with the selected still image being the starting point of the slideshow display, and
   accept commands regarding display of the movie images.

3. The display control apparatus according to claim 2, wherein the circuitry is further configured to determine whether a displayed image is a still image or a movie image and performs a process corresponding to one of the commands regarding display of movie images or a process corresponding to one of the commands regarding display of still images, based on the determination.

4. The display control apparatus according to claim 1, further comprising a touch panel, on the display device, configured to accept the command for the slideshow display.

5. The display control apparatus according to claim 1, wherein one of the movie buttons is selected by a touch screen operation of touching the one of the movie buttons.

6. The display control apparatus according to claim 1, wherein the circuitry is further configured to act as an imaging unit configured to capture the still images and the movie images.

7. A display control method, in a display control device, comprising the steps of:
   accepting commands, by processing circuitry of the display control device, regarding display of still images and movie images, the still images being recorded on a recording medium in a first predetermined order and the movie images being recorded on the recording medium in a second predetermined order; and
   when a command for a slideshow display of the still images has been accepted for a specified selected still image, displaying both still images corresponding to still image data and movie images corresponding to movie image data read from the recording medium in a consecutive order of imaging with the selected still image being a starting point during the same slideshow display,
   displaying an input area, including each of the displayed still images, and including still buttons overlaid on each of the displayed still images that, when selected, perform operations with respect to viewing the displayed still images;
   displaying an input area, including each of the displayed movie images, and including movie buttons overlaid on each of the displayed movie images that, when selected, perform operations with respect to viewing the displayed movie images, the still buttons including a forward button that selects a next image that is located at the same position as a button that selects fast forwarding included in the movie buttons, a button that stops the slideshow that is located at the same position as a button that stops playback of one of the displayed movie images included in the movie buttons, a button that selects a previous image that is located at the same position as a button that rewinds the one of the displayed movie images included in the movie buttons, and a button that initiates the slideshow that is located at the same position as a button that plays and pauses the one of the displayed movie images included in the movie buttons, each of the still buttons and each of the movie buttons being displayed independently of selecting a menu button,
   wherein each of the still images are selectable as the starting point of the slideshow display.

8. The display control method according to claim 7, wherein the command for the slideshow display of the still images is received via a touch panel of the display control device.

9. A non-transitory computer-readable storage medium having computer readable program codes embodied in the computer readable storage medium that, when executed cause a computer to execute processing comprising the steps of:
   accepting commands, by the display control device, regarding display of still images and movie images, the still images being recorded on a recording medium in a first predetermined order and the movie images being recorded on the recording medium in a second predetermined order; and when a command for a slideshow display of the still images has been accepted for a specified selected still image, displaying both still images corresponding to still image data and movie images corresponding to movie image data read from the recording medium in a consecutive order of imaging with the selected still image being a starting point during the same slideshow display, displaying an input area, including each of the displayed still images, and including still buttons overlaid on each of the displayed still images that, when selected, perform operations with respect to viewing the displayed still images;

displaying an input area, including each of the displayed movie images, and including movie buttons overlaid on each of the displayed movie images that, when selected, perform operations with respect to viewing the displayed movie images, the still buttons including a forward button that selects a next image that is located at the same position as a button that selects fast forwarding included in the movie buttons, a button that stops the slideshow that is located at the same position as a button that stops playback of one of the displayed movie images included in the movie buttons, a button that selects a previous image that is located at the same position as a button that rewinds the one of the displayed movie images included in the movie buttons, and a button that initiates the slideshow that is located at the same position as a button that plays and pauses the one of the displayed movie images included in the movie buttons, each of the still buttons and each of the movie buttons being displayed independently of selecting a menu button, wherein each of the still images are selectable as the starting point of the slideshow display.

10. The non-transitory computer readable storage medium according to claim 9, wherein the command for the slideshow display of the still images is received via a touch panel of a display device.

11. A display control apparatus comprising:

reading means for reading still image data from a recording medium on which the still image data, corresponding to still images, is recorded in a first predetermined order and on which movie image data, corresponding to movie images, is recorded in a second predetermined order;

movie image accepting means for accepting commands regarding display of the movie images;

display control means for displaying, on a display device, the still images corresponding to the still image data and the movie images corresponding to the movie image data read by the reading means; and still image accepting means for accepting commands regarding display of the still images, one of the commands specifying a selected still image, wherein when a command for a slideshow display of the still images has been accepted by the still image accepting means, the display control means displays both still images and movie images in a consecutive order of imaging, during the same slideshow display, with the selected still image being a starting point for the slideshow display, the display control means displaying an input area of the still image accepting means including each of the displayed still images, the input area including still buttons overlaid on each of the displayed still images that, when selected, perform operations with respect to viewing the displayed still images, and displaying an input area of the movie image accepting means including each of the displayed movie images, the input area including movie buttons overlaid on each of the displayed movie images that, when selected, perform operations with respect to viewing the displayed movie images, the still buttons including a forward button that selects a next image that is located at the same position as a button that selects fast forwarding included in the movie buttons, a button that stops the slideshow that is located at the same position as a button that stops playback of one of the displayed movie images included in the movie buttons, a button that selects a previous image that is located at the same position as a button that rewinds the one of the displayed movie images included in the movie buttons, and a button that initiates the slideshow that is located at the same position as a button that plays and pauses the one of the displayed movie images included in the movie buttons, each of the still buttons and each of the movie buttons being displayed independently of selecting a menu button, and each of the still images being selectable as the starting point of the slideshow display.

* * * * *